United States Patent [19]
Bassett

[11] Patent Number: 5,132,523
[45] Date of Patent: Jul. 21, 1992

[54] DUAL MODE OPTICAL SCANNING SYSTEM

[75] Inventor: Jonathan D. Bassett, Ithaca, N.Y.

[73] Assignee: NCR Corporation, Dayton, Ohio

[21] Appl. No.: 625,322

[22] Filed: Dec. 10, 1990

[51] Int. Cl.⁵ .................... G06K 7/01; G06K 7/10
[52] U.S. Cl. .................... 235/462; 235/472; 235/455
[58] Field of Search ............ 235/462, 472, 454, 455, 235/383, 470; 902/22; 250/239

[56] References Cited

U.S. PATENT DOCUMENTS

| | | | |
|---|---|---|---|
| 3,925,639 | 12/1975 | Hester | 235/472 |
| 4,387,297 | 6/1983 | Swartz et al. | 235/462 |
| 4,465,926 | 8/1984 | Apitz et al. | 235/472 |
| 4,652,732 | 3/1987 | Nickl | 235/462 |
| 4,672,215 | 6/1987 | Howard | 235/472 |
| 4,766,297 | 8/1988 | McMillan | 235/455 |
| 4,780,707 | 10/1988 | Selker | 235/472 |
| 4,956,783 | 9/1990 | Teranishi et al. | 235/472 |
| 4,971,410 | 11/1990 | Wike et al. | 235/472 |

FOREIGN PATENT DOCUMENTS 0338543 10/1989 European Pat. Off. ............ 235/462

Primary Examiner—Robert Weinhardt
Attorney, Agent, or Firm—Richard W. Lavin

[57] ABSTRACT

A portable bar code scanner comprises a housing member having a pair of sloping supporting surfaces oriented at an angle to each other and a floor portion on which is mounted a reflecting mirror. One of the sloping supporting surfaces includes a transparent substrate. A portable hand-held optical scanner is positioned adjacent the other sloping supporting surface for projecting a plurality of scanning light beams in the form of a scan pattern at the reflecting mirror which reflects the scan pattern onto the transparent substrate over which a bar code label is passed enabling the scanning light beams to scan the bar code label. A magnet mounted adjacent the other sloping supporting surface is sensed by a sensor mounted in the hand-held scanner for generating control signals which are used in operating the scanner in different modes of operation depending on whether the scanner is mounted on the housing or when the scanner is used to freely scan a bar code label.

14 Claims, 3 Drawing Sheets

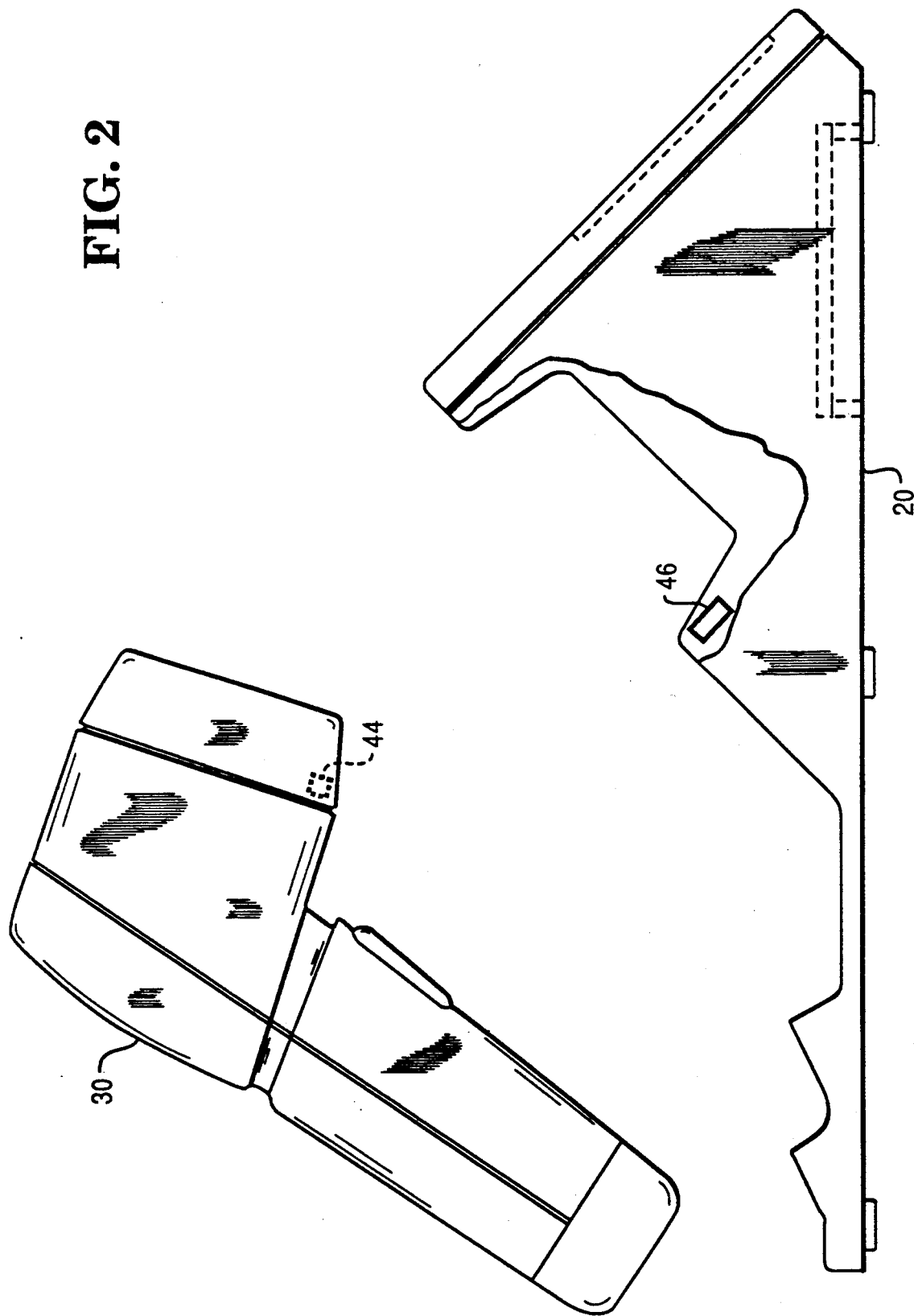

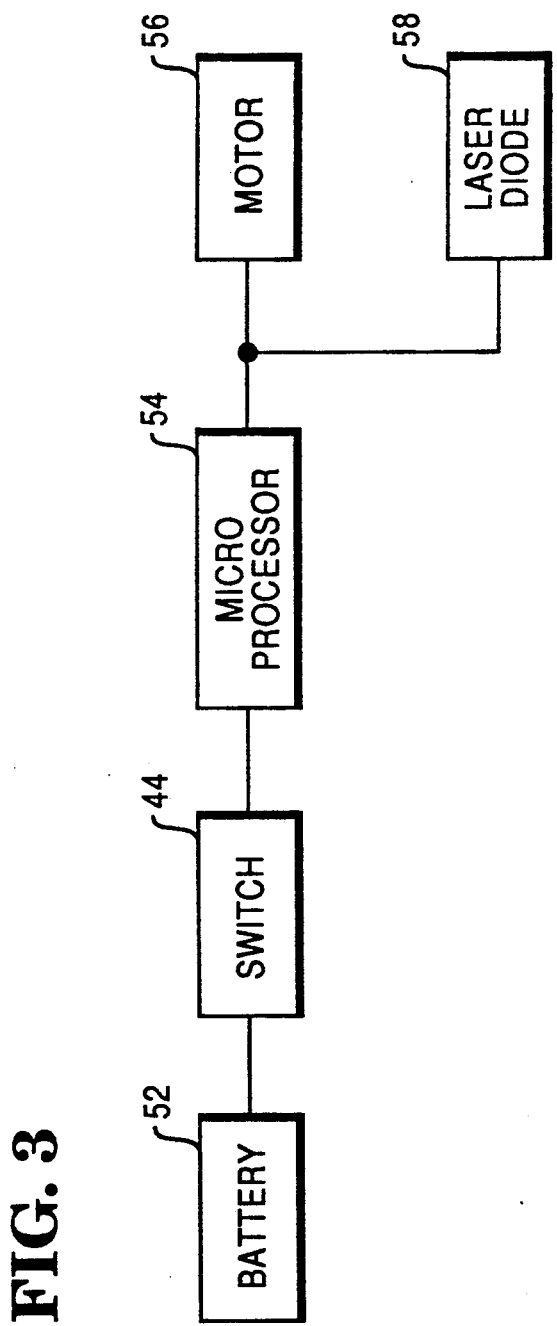

DUAL MODE OPTICAL SCANNING SYSTEM

CROSS REFERENCE TO RELATED APPLICATION

Bar Code Scanning Apparatus, co-pending Application, Ser. No. 07/625,331, filed on even date herewith, invented by Park Doing, Donald W. Carr and Charles K. Wike, Jr., assigned to the NCR Corp.

BACKGROUND OF THE INVENTION

The present invention relates to optical bar code scanning systems and more particularly to a portable bar code scanning device which can be used in either a portable mode of operation or in a stationary mode of operation.

In present-day merchandising point-of-sale operations, data pertaining to the purchase of a merchandise item is obtained by reading data encoded indicia such as a bar code label printed on or attached to the merchandise item. In order to standardize the bar codes used in various point-of-sales checkout systems, the grocery industry has adopted a uniform product code (UPC) which is in the form of a bar code. Reading systems which have been constructed to read this type of bar code include hand-held wands which are moved across the bar code, and stationary optical scanning systems normally located within the cabinet structure of a checkout counter, in which the bar code is read when a purchased merchandise item is moved across a window constituting the scanning area of the counter, which movement is part of the process of loading the item into a baggage cart. Hand-held wands or scanners emit a single scan line which is directed over the bar code by the operator while the stationary optical reader systems emit a multiline scan pattern through which the bar code label is moved, enabling a higher throughput of scanning bar code labels to occur over that of the hand-held scanner. Where the merchandise consists of soft materials such as clothing or other type of wearing apparel, hand-held scanners have been employed to read the bar code labels attached to the material in which the bar code label is manually positioned adjacent the hand held scanner. It has been found that this type of scanning operation has been ineffective in many cases because the bar code label was not positioned within the depth of field of the scanner or that the projected scanning pattern was not properly positioned adjacent the bar code label. In order to overcome this problem, portable scanning devices have been developed which allow hands free scanning operations to occur enabling the operator to use both hands in moving the merchandise item across the scanning device. One example of this type of scanning device is the above cited co-pending application Ser. No. 07/625,331 in which the portable hand-held scanner is positioned on a portable scanning device which utilizes the scanning light beams from the operating hand-held scanner to project a scan pattern on a scanning window in the scanning device. Where the checkout operation requires the hand-held scanner to be used in a hand-held mode, the scanner is removed from the scanning device. To enhance the performance of the scanning operation, it would be desirable for the electronics associated with the operation of the hand-held scanner to know what scanning mode the scanner is in so as to initiate an operation of the scanner or to alter scanner parameters which affect the operating performance of the scanner. For example, the scanner's trigger mode can be changed from a finger-pull trigger to an automatic-read operation when a hands-free scanning operation is desired. Another parameter is the level of intensity of the scanning light beams with the level increasing when the scanning device is used in the hand-held mode.

The background art known to the applicants at the time of the filing of this application includes U.S. Pat. No. 4,369,361 which discloses a portable stand-alone desk-top laser scanning workstation including a laser scanning head mounted above a support base facing the operator in which objects bearing bar code symbols to be scanned are passed under the head, and U.S. Pat. No. 4,766,297 which discloses a support member for supporting a portable hand-held scanning device in which the support member includes structure for sensing the presence of an object between the head portion and the base portion of the support member and for automatically initiating a reading of a bar code symbol by the portable handheld scanning device each time the sensing structure senses the presence of an object.

SUMMARY OF THE INVENTION

A portable bar code scanning system is provided which comprises a housing member including first and second opposed exterior sloping surfaces in which the first surface includes a recessed portion while the second surface has a transparent substrate mounted therein and which further includes a mirror member mounted on the floor of the housing member between the sloping surfaces. The housing member further includes an extension portion having a supporting surface on which is mounted one end of a hand-held bar code scanning device. The other end of the scanning device is positioned within the recessed portion in the first surface. The housing member also includes an operating means such as a magnet positioned adjacent the recessed portion while the scanning device includes a sensor member operated by the operating means and control means for initiating the operation of the scanning device upon the sensor member sensing the operating means. Upon operation of the bar code scanner when the scanner is mounted on the housing member, light beams forming an optical scanning pattern are projected from the bar code scanner through the first sloping surface towards the mirror member which reflects the scanning pattern onto the transparent substrate mounted in the second sloping surface. The operator will move the bar code label across the substrate member in the second sloping surface adjacent the scanning pattern projected thereon to complete a scanning operation of the bar code label. When it is required to use the bar code scanner in a hand-held scanning mode, removing the scanner from the recessed portion will cause the sensor member to generate control signals notifying the processing electronics of the scanner of the hand-held scanning operation.

It is therefore a principal object of this invention to provide a portable optical bar code scanning apparatus which includes a removable handheld scanner as the source of scanning light beams and means in said scanner for detecting the operating mode of the scanner when mounted or removed from the scanning device.

It is another object of this invention to provide a bar code scanning apparatus which is light weight, simple in construction and therefore low in cost.

BRIEF DESCRIPTION OF THE DRAWINGS

These and other objects, features and advantages of the invention, as well as the invention itself, will become more apparent to those skilled in the art and in light of the following detailed description taken in consideration with the accompanied drawings wherein like reference numerals indicate like or corresponding parts throughout the several views and wherein:

FIG. 2 is a view similar to FIG. 1 showing the hand-held scanner removed from the housing member.

FIG. 3 is a block diagram of the operating system of the hand-held scanner.

DESCRIPTION OF THE PREFERRED EMBODIMENT

Figure 1:
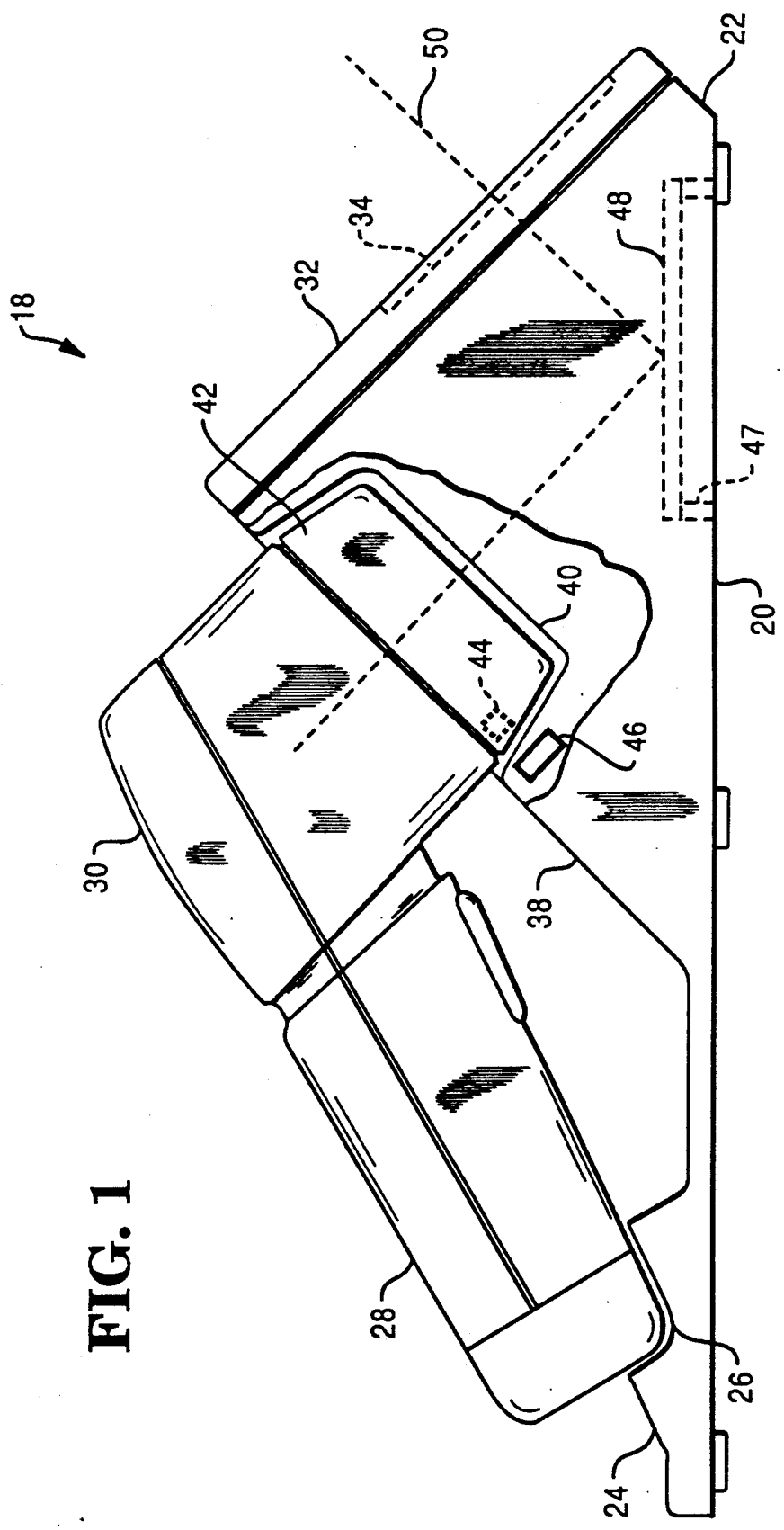
FIG. 1 is a right side elevational view of the portable optical bar code scanning apparatus of the present invention with a portion of the housing member removed showing details of the mounting of the hand-held scanner within the scanning apparatus and the location of the magnet within the housing member and the magnetic sensor within the scanner.

Referring now to FIG. 1, there is shown a side view of the bar code scanning system of the present invention generally indicated by the numeral 18 which includes a housing member 20 comprising a front housing portion 22 and a rear portion 24 including a cutout portion 26 to accommodate the rear end portion 28 of a hand-held bar code optical scanner 30. The front housing portion 22 includes a sloping front surface 32 which includes a transparent substrate 34 mounted therein on which is projected a scanning pattern (not shown). The front surface 32 is inclined in a upward direction.

The housing member 20 further includes a rear sloping surface 38 which includes a recessed portion 40 in which is positioned a head portion 42 of the optical scanner 30. Mounted in the head portion 42 is a magnetic sensor or switch 44 which may comprise a Hall sensor. An example of a Hall sensor that is commercially available is Part No. UGN-3040T/U manufactured by The Sprague Electric Co. of Concord, New Hampshire. Mounted in the front housing portion 20 adjacent the recessed portion 40 is a magnet 46. Mounted on a support member 47 secured to the floor of the housing member 20 is a mirror member 48 which reflects scanning light beams projected along the beam axis 50 by the hand-held scanner 30. The scanning light beams in the form of a scanning pattern (not shown) are reflected from the mirror member 48 to be focused on the surface of the transparent substrate 34 enabling the operator to position the bar code label which is to be scanned adjacent the scanning pattern. Reference may be directed to the previously cited NCR patent application Ser. No. 07/625,331 for a complete disclosure of the housing member 20, which disclosure is entirely incorporated herein by reference.

Referring to FIG. 3 there is shown a system block diagram of the hand-held scanner 30 which includes a battery 52, a microprocessor 54, the magnetic sensor or switch 44 coupled to the battery 52 and the microprocessor 54, a motor 56 coupled to the microprocessor 54, used in generating a plurality of scan lines in a manner that is well known in the art, and a laser diode 58 coupled to the microprocessor which generates the laser scanning light beams used in scanning the bar coded label.

In the operation of the bar code scanning device 18 the operator will position the end portion 28 of the hand-held scanner 30 within the cutout portion 26 of the housing member 20. The operator will then insert the head portion 42 of the scanner 30 within the recessed portion 40 of the housing member, which movement positions the sensor 44 adjacent the magnet 46. In sensing the presence of the magnet 46, the sensor 44 will output a control signal to the microprocessor 54 which enables the microprocessor to alter several parameters to enhance the performance or usability of the scanner 30 when mounted in the housing member. This includes initiating the operation of the scanner by energizing the motor 56 and the laser diode 58. When the scanner 30 is removed from the housing member 20, the sensor 44 will generate a second control signal enabling the microprocessor 54 to control the scanner 30 for a normal hand-held scan operation. While a magnet has been disclosed as the source of sensing energy, it is obvious that other sources of sensing energy may be used. Thus element 46 (FIG. 2) may comprise a photodiode whose light output can be detected by a photodetector mounted in the scanner.

As previously described, the present invention enables the microprocessor 54 (FIG. 3) to know the mode of operation of the hand-held scanner 30. Where the scanner is to be positioned on the housing member 20 during a scanning operation, the signals generated by the sensor member 44 enables the microprocessor to energize the motor 56 and the laser diode 58 for a hands-free scanning operation. When the scanner 30 is to be operated in a hand-held operation, the removal of the scanner from the housing member results in the sensor member generating signals notifying the microprocessor of this type of scanning operation which may operate the laser diode to increase the intensity of the scanning light beams.

Although the preferred embodiment of the present invention has been described herein, it is not intended that the invention be restricted thereto, but that it be limited only by the true spirit and scope of the appended claims.

What is claimed is:

1. An optical scanning system comprising:
   support means having a scanning aperture through which scanning light beams are projected for scanning coded indicia positioned adjacent the scanning aperture;
   an activatable source of scanning light beams movably positioned on said support means and in communication with said scanning aperture;
   and sensing means mounted in said source of scanning light beams for sensing the positioning of said source only when said source is at rest on said support means, said sensing means activating said source in response to sensing the positioning of said source only when said source is at rest on said support means whereby said source will project the scanning light beams through the scanning aperture.

2. The scanning system of claim 1 in which said source of scanning light beams comprises a handheld scanner.

3. The scanning system of claim 1 which further includes operating means within the support means for operating said sensing means mounted in said source and wherein said sensing means comprises a sensor member mounted in said source of scanning light beams, said sensor member activating said source upon being operated by the operating means.

4. The scanning system of claim 3 in which the operating means comprises a magnet.

5. The scanning system of claim 3 in which said operating means comprises a light source.

6. A scanning system for scanning coded symbols comprising:

a housing member including a first supporting surface oriented in a first direction with an aperture therethrough for passing scanning light beams, a second supporting surface oriented at an angle to the first supporting surface, and a third supporting surface oriented at an angle to said first and second supporting surfaces;

reflecting means mounted inside said housing member on said second supporting surface in the path of the scanning light beams;

a transparent substrate mounted in said third supporting surface in the path of the scanning light beams reflected from the reflecting means; and a movable source of said scanning light beams adapted for first and second modes of operation, said source when in said first mode of operation being mounted adjacent said first supporting surface for projecting said light beams in a direction towards said reflecting means which reflects the scanning light beams through said transparent substrate for scanning a bar code label positioned adjacent the transparent surface, said source when in said second mode of operation being hand-held for projecting said light beams in a direction towards said bar code label;

means mounted in said source of scanning light beams for sensing the mounting of the source adjacent said first supporting surface, said sensing means generating a first control signal in response to sensing the mounting of the source adjacent said first supporting surface; and control means within said source and coupled to said sensing means for controlling the activation of said source, said control means activating said source in said first mode in response to the generation of said first control signal whereby the scanning light beams are projected towards said reflecting means for scanning a bar code label positioned adjacent said first supporting surface.

7. The scanning system of claim 6 in which said sensing means generates a second control signal when said source is removed from adjacent said first supporting surface whereby said control means activates said source and increases the intensity of the scanning light beams in said second mode of operation in response to the generation of said second control signal whereby the scanning light beams are projected towards said bar code label positioned adjacent said source.

8. The scanning apparatus of claim 6 in which the source of scanning light beams comprises a portable hand-held scanning unit.

9. The scanning apparatus of claim 6 in which the housing member includes a source of magnetic radiation and said sensing means comprises an magnetic radiation sensor.

10. The scanning apparatus of claim 9 in which the source of magnetic radiation comprises a magnet member mounted adjacent the first supporting surface of said housing member.

11. A scanning system for scanning bar coded labels comprising:

a housing member including a first supporting surface oriented in a first direction with an aperture therethrough for passing scanning light beams, a second supporting surface oriented at an angle to the first supporting surface, and a third supporting surface oriented at an angle to said first and second supporting surfaces;

a mirror member mounted inside said housing member on said second supporting surface in the path of the scanning light beams;

a transparent substrate mounted in said third supporting surface in the path of the scanning light beams reflected from the reflecting means; and a portable movable hand-held optical scanner for generating a plurality of said scanning light beams and adapted for first and second modes of operation, said optical scanner when in said first mode of operation being positioned adjacent said first supporting surface for projecting said scanning light beams in a direction towards said mirror member which reflects the scanning light beams through said transparent substrate for scanning a bar code label positioned adjacent the transparent surface, said optical scanner when in said second mode of operation being hand-held for projecting said light beams in a direction towards said bar code label;

means mounted in said optical scanner for sensing the positioning of the optical scanner adjacent said first supporting surface, said sensing means generating a first control signal in response to sensing the positioning of the source adjacent said first supporting surface; and control means within said optical scanner and coupled to said sensing means for controlling the activation of said optical scanner in said first and second modes of operation, said control means activating said optical scanner in said first mode in response to the generation of said first control signal whereby the scanning light beams are projected towards said mirror member for scanning a bar code label positioned adjacent said first supporting surface.

12. The scanning system of claim 11 in which said sensing means generates a second control signal when said optical scanner is removed from adjacent said first supporting surface whereby said control means activates said optical scanner in said second mode of operation and increases the intensity of the scanning light beams in response to the generation of said second control signal whereby the scanning light beams are projected towards said bar code label positioned adjacent said optical scanner.

13. The scanning apparatus of claim 11 in which the housing member includes a source of magnetic radiation and said sensing means comprises a magnetic radiation sensor.

14. The scanning apparatus of claim 13 in which the source of magnetic radiation is a magnet positioned adjacent the first supporting surface.

* * * * *